Feb. 9, 1965   R. S. KRIEGER   3,168,990
APPARATUS FOR DISINTEGRATING GRANULAR PARTICLES
Filed April 30, 1963   4 Sheets-Sheet 1

INVENTOR.
RICHARD S. KRIEGER
BY
ATTYS.

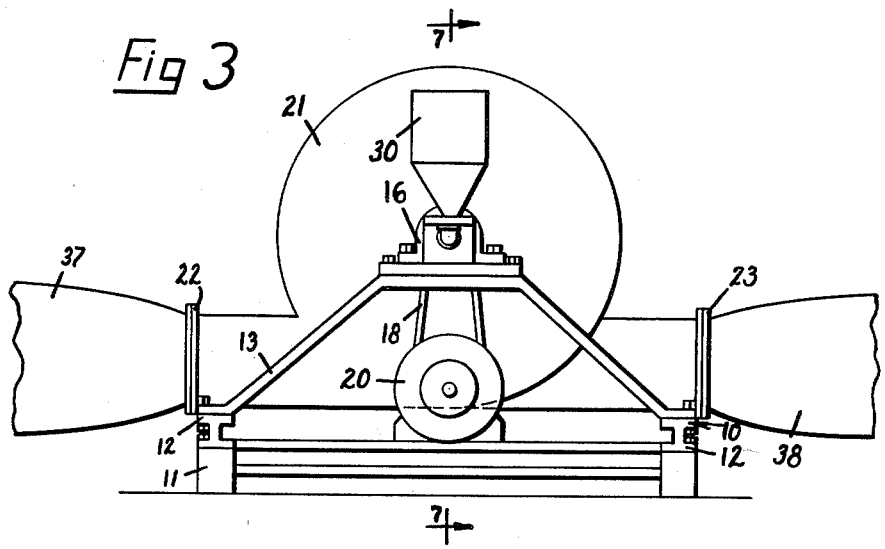
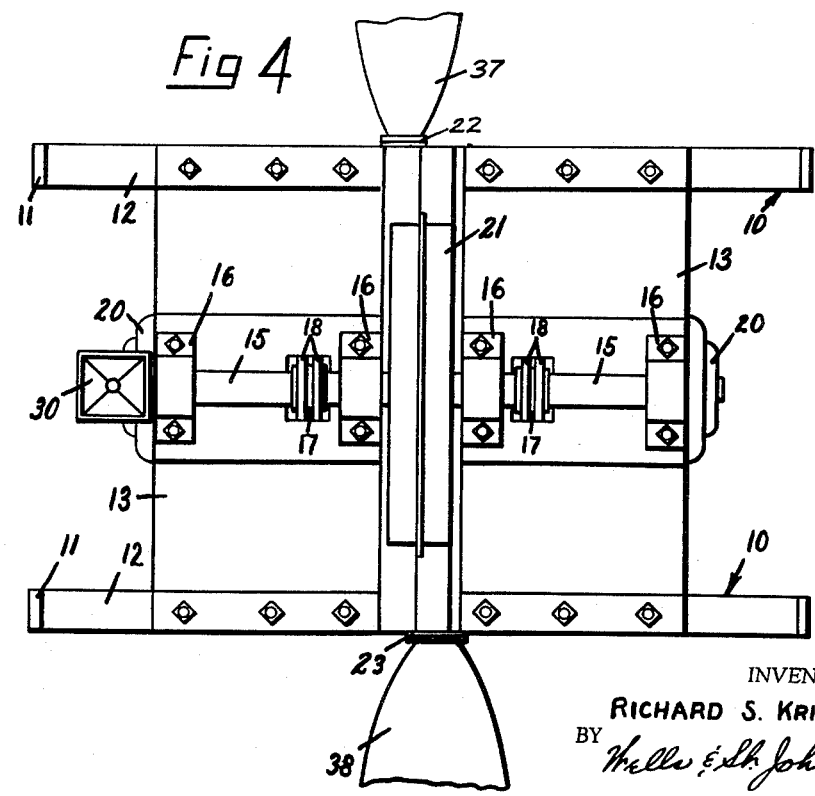

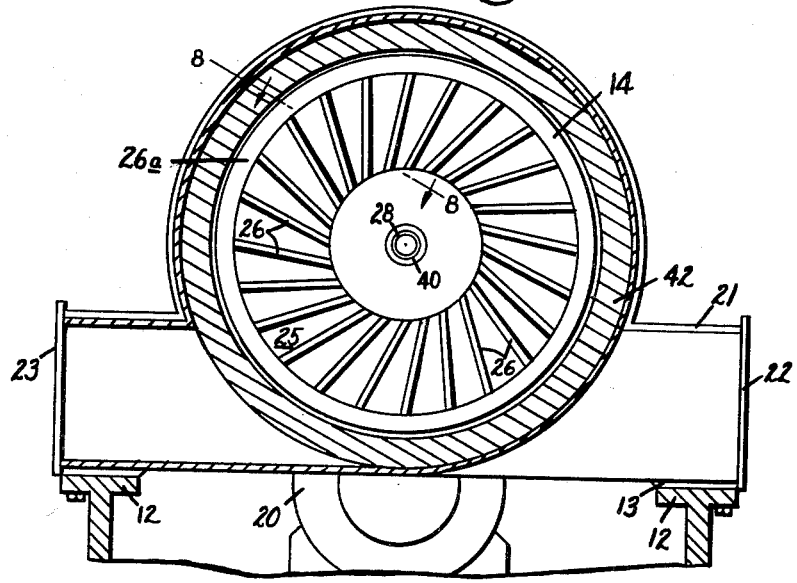
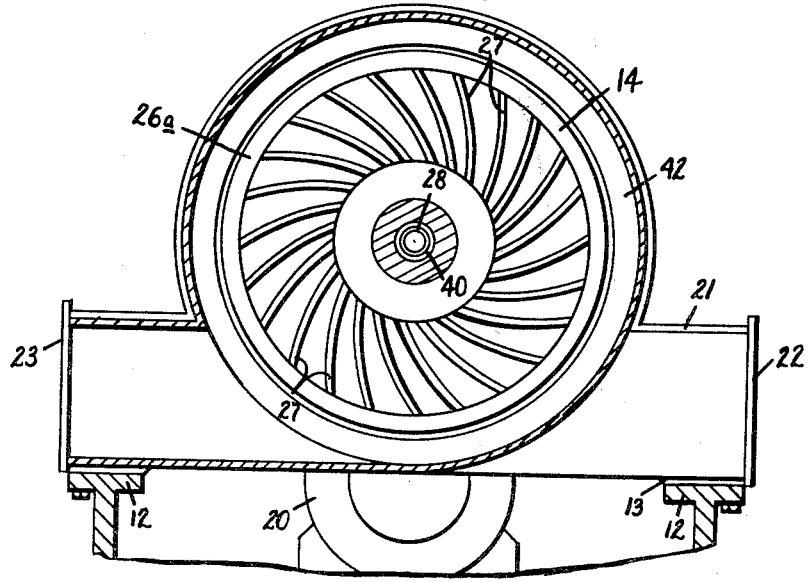

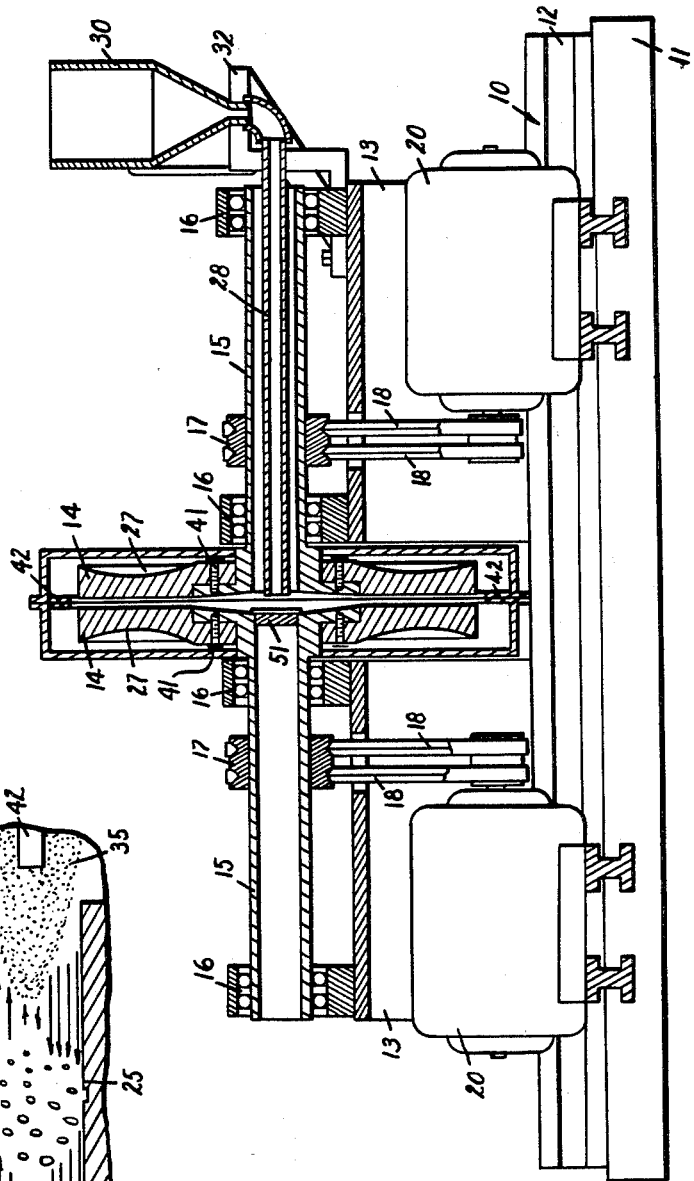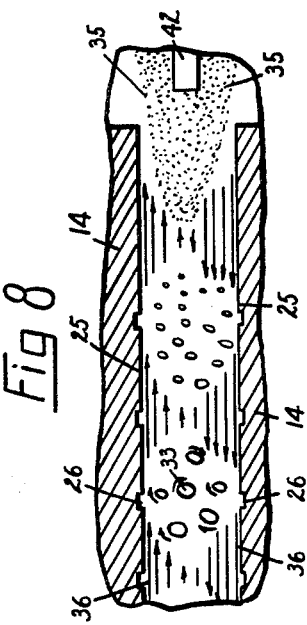

United States Patent Office 3,168,990
Patented Feb. 9, 1965

3,168,990
APPARATUS FOR DISINTEGRATING
GRANULAR PARTICLES
Richard S. Krieger, E 1908 Mallon, Spokane, Wash.
Filed Apr. 30, 1963, Ser. No. 276,742
3 Claims. (Cl. 241—248)

This application is a continuation-in-part of my prior application, Ser. No. 166,108, filed January 15, 1962, now abandoned.

This invention relates to a novel method of disintegrating solid particles and also relates to a novel apparatus for carrying out the steps of the method.

The following description is concerned with the disintegration of solid particles of inorganic materials such as natural rock, minerals and metals. Basically the purpose of the invention is to provide a simple and highly efficient method of converting solid particles to an extremely fine dust. The application of this invention will be seen to extend to many industries wherein small particles of solid matter are desired. The invention is particularly adapted for use in the refinement of metals and will be seen to have a wide variety of uses in many analagous applications.

It is a first object of this invention to provide a simple one step process by which granular particles of solid matter may be reduced to an extremely small dimension. The method, when carried out according to the practice stated below, requires no manual adjustment or supervision. It may be carried out by several different devices, there being one practical embodiment described below.

A second object of this invention is to provide an apparatus for carrying out the method of this invention. This apparatus is extremely simple in mechanical structure and yet is highly effective in actual practice. Proven tests on this structure have effectively reduced hard substances to fine powder of extremely small granular proportions.

Another object of this invention is to provide a disintegrating process wherein the particles being acted upon are maintained in a gaseous medium and wherein the gaseous medium itself transmits the necessary forces to the particles to effect the breaking up of their physical structures. This object eliminates the necessity of grinding faces and the ensuing wear on such surfaces. In actual practice, a pair of disks formed of aluminum have been used to accelerate particles of extremely hard physical properties and have successfully accomplished the disintegration of these particles to a fine dust without any physical wear on the relatively soft disk faces.

Another object is to provide a practical feeding arrangement of the center of the disks using only the gaseous stream produced by disk rotation as the moving force. This insures even disintegration of each particle due to the common starting point, but requires no moving mechanisms.

These and further objects will be evident from a study of the following disclosure when taken in conjunction with the accompanying drawings which illustrate one preferred apparatus used in the practice of this invention. It is to be understood at the offset that this exemplary apparatus is not intended to fully restrict or limit the scope of my invention and that other equivalent machines are anticipated which may carry out the essential steps of my process with equal or improved effectiveness.

In the drawings:

FIGURE 3 is an end view of the apparatus shown in FIGURE 1 with the extremities of the collecting bags being broken away;

FIGURE 4 is a top view of the structure as illustrated in FIGURE 3;

FIGURE 5 is an enlarged sectional view taken along line 5—5 in FIGURE 1;

FIGURE 6 is an enlarged sectional view taken along line 6—6 in FIGURE 1;

FIGURE 7 is an enlarged sectional view taken along line 7—7 in FIGURE 3; and

FIGURE 8 is a diagrammatic view illustrating the manner in which the particle disintegration is believed to be effected, this view being taken substantially along the line 8—8 in FIGURE 5.

Figure 1:
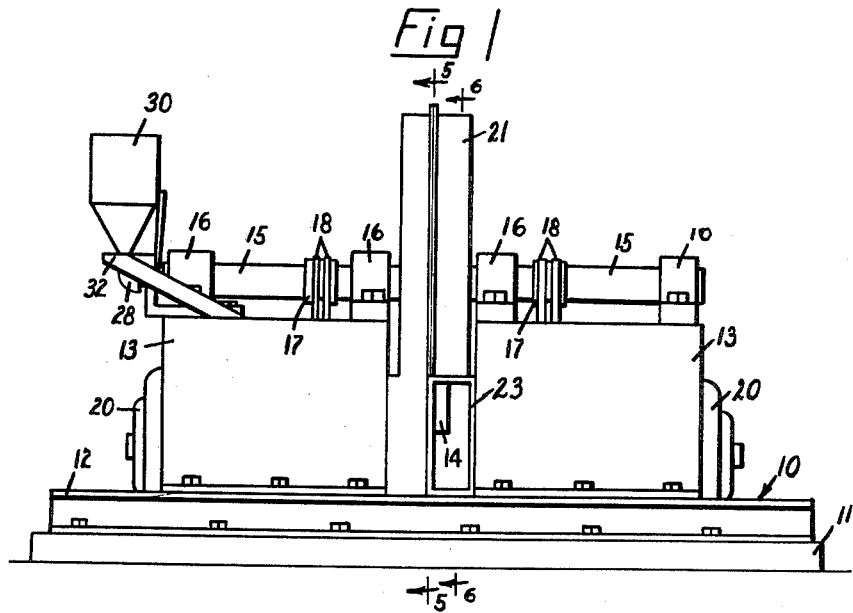
FIGURE 1 is a front view of the apparatus constructed according to this invention with the forward collecting bag being removed.

The method with which this description is concerned is easily described but is not fully understood from a physical standpoint. The basic concept of this method is that one may disintegrate the physical structure of a solid particle by accelerating the particle between two oppositely moving sheets of a gaseous medium such as air. The motion imparted to the particle will primarily be a rotational movement about its own central axis. It is believed that the centrifugal force exerted upon the component elements of the particle by this extremely high rotational velocity about its own axis acts eventually to tear the particle apart. This centrifugal action is believed to be further supplemented by the frictional heat generated between the two moving sheets of the gaseous medium and the frictional forces which exist between each sheet and the initial particles. This heating of the particles as they are accelerated is believed to further reduce their cohesive character and thus facilitate the physical breaking of the particle structure. The particular means by which this method is believed to be carried out with regard to the apparatus shown in the drawings will be described in detail below.

The above method is a generalized formula for effecting disintegration of inert solid particles. The manner in which the two sheets of moving gaseous medium are maintained at the necessarily high speed involved may vary from one practical application to another. Using modern mechanical components the most feasible manner of effecting such extremely high velocities is by the use of rotating bodies. However, it is entirely conceivable that other methods of providing the necessary steps of the above process will present themselves to those studying this description. One such alternative might be the provision of translational sheets of air or other gas entrapped between two closely adjacent belt surfaces. The problems involved in such a design will become more apparent as this description proceeds.

Figure 2:
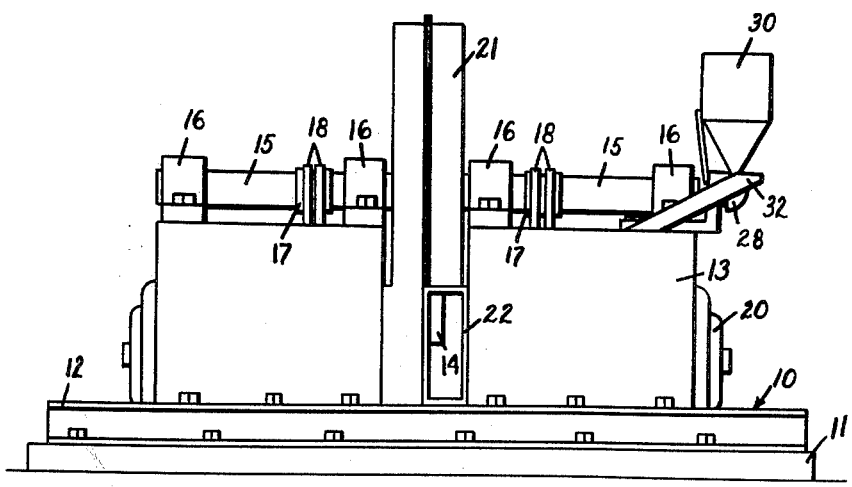
FIGURE 2 is a rear view of the apparatus shown in FIGURE 1 with the rear collecting bag also being removed.

The specific apparatus by which the above method has been put into actual practice is generally illustrated in FIGURES 1 to 4. It includes a rigid supporting frame generally designated by the numeral 10. The frame 10 mounts and supports all the elements of the machine. These elements are supported on the foundation surface by means of a wood base 11. The base 11 provides the resilient supporting structure and tends to dampen the operating characteristics of the machine. Mounted directly on the base 11 is a rectangular I-beam frame 12. The frame 12 supports a pair of solid plates 13 bent in a trapezoidal cross-sectional configuration (FIG. 3) which are formed of steel or another suitable material having the necessary structural rigidity. This simple structure constitutes the entire frame 10 and has proven to be sufficiently rigid and strong to withstand the forces effected by the operation of the machine.

Mounted between the two solid plates 13 are a pair of identical disks 14, having vertical positions. Each of these disks is mounted in an identical fashion on the frame 10 and identical numbers shall be used to designate the respective parts associated therewith. Each disk 14 is fixed to a shaft 15 which is coaxially located relative to the respective disk 14. Each shaft 15 is rotatably supported on the frame 10 by means of a pair of spaced bearings 16. When properly mounted, the shafts 15 and the disks 14 will be located on the frame 10 for rotation about a common axis.

The shafts 15 and associated disks 14 are rotated by means of individual motors 20 mounted on the frame 10 below the plates 13. Each motor 20 drives one of the shafts 15 by means of a belt 18 and a pulley 17. The motors 20 rotate the shafts 15 in opposite angular directions.

Disks 14 are enclosed in a sealed housing 21 comprising two chambers separated by an annular ring 42. Each of the housing chambers communicates with individual tangential outlets 22 and 23, connected to suitable collecting bags 37, 38 respectively. The bags 37 and 38 may be formed of cloth or other porous material which can allow the passage of gaseous substance such as air which will effectively filter and trap solid particles of very small dimensions. The two bags 37 and 38 will function in much the same manner as analogous bags on vacuum cleaners and furnace cleaners.

The specific structure of each disk 14 is illustrated in FIGURES 5, 6 and 7. Each disk 14 has a plane face 25 which opposes the identical face of the remaining disk 14. The separation between the faces 25 will vary in each application, depending upon the disk diameter and speed of rotation, plus the cohesive characteristics and size of the particles to be reduced. In every instance the separation must be such as to insure disintegration of particles trapped within the adjacent air streams. Each face 25 is provided with a series of shallow grooves 26 which are cut into the respective face 25 so as to provide a somewhat roughened surface. The depth of the grooves 26 is much less than the separation between the two faces 25 and in some instances may be eliminated entirely. Grooves 26 extend only partially across the face 25 which is provided with an annular outside rim 26a of unbroken surface configuration.

The disks 14 are also provided with fins 27 formed on their outside surfaces in radially projecting directions. These fins 27 are designed to throw air radially outward along the outside face of the respective disk 14. The purpose of these fins 27 is to insure the maintenance of a high pressure area along the outside peripheral rim of each disk 14 so as to prevent the entry of the broken dust particles back along the disks 14 between the disks 14 and the adjacent wall of the housing 21. Other equivalent fan shapes could be utilized.

In the embodiment illustrated in these drawings a single feed tube 28 is illustrated. The tube 28 is rigidly fixed within an axial cylindrical aperture 40 formed through the center of the shaft 15 and extending through the plane of the disk 14. In reality each shaft 15 is provided with a central hub on which the disk 14 is secured by bolts 41. The feed tube 28 communicates with a hopper 30 which directs the particles to the interior of tube 28. The tube 28 extends to the central area separating the two disks 14. A solid plug 51 is provided in the remaining shaft 15. Where desired, another feed tube could be mounted within the remaining shaft 15 for feeding of particles from both sides of this machine. The feed tube 28 is rigidly fixed by a bracket 32 and does not rotate with the surrounding shaft 15. The object of this construction is to eliminate the centrifugal forces on the particles which would result if they were fed directly through the aperture 40 of the shaft 15.

The materials of which the components described above are constructed may be chosen from any suitable materials available. In actual practice it is necessary to construct the disks 14 of a material capable of withstanding the high centrifugal forces to be encountered within the disk structure itself. One such material that has been actually proven is drop forged aluminum. The shafts 15 must be formed of a high strength material such as steel since these shafts must withstand high rotational stresses without bending or yielding in any manner, and also must withstand abrasion of the particles as they are fed within the center of the apparatus. Abrasion of the disks 14 appears to be no problem as will be explained below. For this reason relatively soft and light material such as aluminum has been successfully used in the construction of the disks 14.

The machine described above has been constructed and tested and has effectively reduced particles of hard material to a very fine dust. The manner in which the method of this invention actually proceeds is somewhat in doubt due to the speeds involved. The feeding of the particles is accomplished by a differential pressure exerted across the face of the disks 14 from their center to their peripheries. This pressure is created mainly by the effect of the disk peripheries themselves. Since the disks 14 are rotated in opposite directions, the air thrown from each disk 14 would normally react turbulently with that thrown from the opposite disk 14. This turbulence is minimized by the provision of the dividing ring 42 fixed to the interior of the housing 21 and extending about the disks 14 within the space separating them. The ring 42 therefore allows the disks 14 to individually create a differential pressure across their faces and to thereby insure movement of the particles from the center of each disk 14 to its periphery.

There is no resulting centrifugal force on the particles themselves while carried between the two disks 14, since the centrifugal force exerted due to the rotation of one disk 14 cancels that created due to the rotation of the other disk 14. The preferred use of suction pressure to feed particles through the tube 28 insures a steady slow stream of particles being carried across the faces of the disks 14. Other types of feed mechanisms may be substituted for this differential air mechanism and may be utilized to carry the particles through the tube 28. As an example, a screw feed mechanism may be utilized within the interior of tubes 28. However some external force must be exerted on particles as they emerge from the tube 28 and this force must be either pneumatic or an equivalent type of another force. As an example, perhaps a differential magnetic field could be utilized to draw the particles radially along the faces 25.

As shown in FIGURE 8, the individual particles emerge from the tube 28 and are immediately drawn by the differential air pressure in a radial direction. The disks 14 in actual practice have been rotated at a speed such that the relative velocity of the peripheries of the disks approaches or surpasses the speed of sound. A relative peripheral velocity of 900 feet per second at the outer edges of the disks 14 has been found to be quite satisfactory in breaking up hard particles.

As shown in FIGURE 8, it is believed that the initial particles 33 as fed from the tube 28 are guided toward the central plane separating the two disks 14. This appears to be due to a compression of the air directly adjacent the two disks 14 and the formation of a relatively low pressure plane in the center of their separation. As the particles 33 travel radially outward from the center of the two disks 14, they are accelerated due to the increasing radius of rotation. They are also accelerated about their own individual axes due to the resulting couple effected by the two opposing sheets of air. It is believed that eventually the particles 33 are spun so violently and so rapidly that the internal centrifugal force actually tears apart their initial physical structures. This results in the formation of smaller particles 34 which in turn are carried radially outward and which also are accelerated about their own individual axes along the center plane. This appears to be a progressive disintegration as each particle breaks down into smaller particles until finally a very fine dust 35 emerges at the peripheries of the disks 14. The air currents in the two opposing sheets of air are designated by arrows 36 which are lengthened to show increased velocity and which are darkened to show increased pressures. The analysis of this action is somewhat problematical and obviously may include several factors besides centrifugal disintegration. It is altogether possible that many particles rub against adjacent particles and, due to their extremely high rates of speed in opposite direction, cause one another to physically break apart. It is also possible that some violent collisions occur, although this appears to be a minor factor since all the particles are moving in basically the same direction. Another factor is the heat provided by the frictional engagement of the two sheets of air and by the frictional engagement of each sheet with the particles 33 to 35. This heat probably lessens the cohesive forces which maintain the particles in their initial state. At any rate the practical result is an extremely efficient and effective transformation of the initial solid particles to a very fine dust.

The final reduced particles feed into the separate air streams produced by the individual disks 14 at each side of ring 42 and are received in the separate bags 37, 38. The two outlets located at the respective sides of the housing prevent turbulence and insure the necessary negative pressure for feeding of particles through tube 28.

It is important to note that this invention is concerned with the disintegration of particles in a gaseous medium. The advantage of using a gaseous medium appears to be the compression which is afforded thereby in contrast to a liquid medium which is practically incompressible. It appears that this compressibility provides a very high pressure area directly adjacent the disk 14 which protects the surface 25 from abrasion. Despite the obvious high speeds and random movement of the particle, in actual practice it has been proven that an aluminum face 25 can be used to effect rapid disintegration of rock and mineral ores. The disk 14 after many tests shows no sign of wear or abrasive forces.

The above device is submitted as a workable and proven apparatus for carrying out the basic method of this invention It is altogether possible that other devices may follow which will also effectively carry out the process steps. For these reasons the concepts of this invention are not to be limited or restricted except as they are set out in the following claims.

Having thus described my invention, I claim:

1. An apparatus for disintegrating solid particles of matter, comprising:
   a rigid support frame;
   a pair of identical coaxial disks, each having a substantially flat face located in opposition to one another at closely adjacent positions;
   a pair of shafts fixed respectively to said disks in a coaxial relationship thereto, the shafts being extended outwardly from said disks in opposite directions, one of said shafts being provided with a cylindrical axial bore throughout its length, said bore being extended axially through the disk fixed to said one shaft;
   bearing means mounted on said frame rotatably journalling said shafts for rotation about a common axis relative to said frame;
   a hollow cylindrical tube fixed to said frame and extending coaxially through the bore of said one shaft, said tube having one end thereof open in communication with the space separating said disks;
   a hopper fixed to said frame and opening in communication with the interior of said tube adapted to direct material therein into said tube;
   vane means on each of said disks adapted to effect a vacuum pressure at the disk peripheries when rotated;
   an enclosed sealed housing encircling said disks, said housing including an annular barrier extending radially inward from the housing to a location positioned intermediate the two faces of said disks and separate tangential outlets opening to the interior of said housing at each side of said barrier;
   collecting means mounted on said housing in communication with said outlets;
   and means on said frame structure operatively connected to said shafts adapted to rotate said disks relative to one another about their common axis at peripheral speeds sufficient to insure disintegration of particles located between the disk faces.

2. An apparatus for disintegrating solid particles of matter comprising:
   a rigid support frame;
   a pair of identical coaxial discs, each having a substantially flat face located in opposition to one another at closely adjacent positions;
   a pair of shafts fixed respectively to said discs in a coaxial relationship thereto, the shafts being extended outwardly from said discs in opposite directions, one of said shafts being provided with a cylindrical axial bore throughout its length, said bore being extended axially through the disc fixed to said one shaft;
   bearing means mounted on said frame rotatably journalling said shafts for rotation about a common axis relative to said frame;
   feed means extending through the bore of said one shaft to the central area separating said discs, said feed means being adapted to direct particles to the center of said discs;
   means on said frame structure operatively connected to said shafts adapted to rotate said discs relative to one another about their common axis at peripheral speeds sufficient to insure disintegration of particles located between the disc faces;
   vaned fins formed on the outside surfaces of said discs adapted to effect a vacuum pressure at the periphery of said discs when rotated;
   an enclosed housing encircling said discs and sealed tightly about the peripheries of said shafts;
   an interior annular solid barrier fixed to said housing in a location aligned with the separation of said discs, said barrier being extended radially inward from said housing to a peripheral location adjacent said discs;
   and a porous bag opening to the interior of said housing at the periphery thereof.

3. An apparatus for disintegrating solid particles of matter, comprising:
   a rigid support frame;
   a pair of identical coaxial discs, each having a substantially flat face located in opposition to one another at closely adjacent positions;
   a pair of shafts fixed respectively to said discs in a coaxial relationship thereto, the shafts being extended outwardly from said discs in opposite directions, one of said shafts being provided with a cylindrical axial bore throughout its length, said bore being extended axially through the disc fixed to said one shaft;
   bearing means mounted on said frame rotatably journalling said shafts for rotation about a common axis relative to said frame;
   feed means extending through the bore of said one shaft to the central area separating said discs, said feed means being adapted to direct particles to the center of said discs;
   means on said frame structure operatively connected to said shafts adapted to rotate said discs relative to one another about their common axis at peripheral speeds sufficient to insure disintegration of particles located between the disc faces.

vaned fins formed on the outside surfaces of said discs adapted to effect a vacuum pressure at the periphery of said discs when rotated;

an enclosed housing encircling said discs and sealed tightly about the peripheries of said shafts;

an interior annular solid barrier fixed to said housing in a location aligned with the separation of said discs, said barrier being extended radially inward from said housing to a peripheral location adjacent said discs;

and a pair of openings in said housing located respectively at radially spaced positions from the two discs, adapted to receive the gaseous streams produced by the respective discs in independent fashion.

References Cited by the Examiner
UNITED STATES PATENTS

| 214,243 | 4/79 | Duc | 241—26 |
| 2,164,409 | 7/39 | Johnson | 241—5 |
| 2,394,182 | 2/46 | Inglis | 241—251 |
| 2,502,022 | 3/50 | Paul | 241—5 |
| 2,707,594 | 5/55 | Moore | 241—5 |
| 3,118,624 | 1/64 | Dill et al. | 241—251 |

ANDREW R. JUHASZ, *Primary Examiner.*